(No Model.)

J. H. HALDEMAN.
COMBINED GUARD AND CLEANER FOR LAWN RAKES.

No. 479,940. Patented Aug. 2, 1892.

Witnesses
Albert Speiden.
Van Buren Hillyard.

Inventor
John H. Haldeman.
By his Attorneys
R.S. & H.P. Lacey

UNITED STATES PATENT OFFICE.

JOHN H. HALDEMAN, OF MARIETTA, PENNSYLVANIA.

COMBINED GUARD AND CLEANER FOR LAWN-RAKES.

SPECIFICATION forming part of Letters Patent No. 479,940, dated August 2, 1892.

Application filed September 19, 1891. Serial No. 406,250. (No model.)

*To all whom it may concern:*

Be it known that I, JOHN H. HALDEMAN, a citizen of the United States, residing at Marietta, in the county of Lancaster and State of Pennsylvania, have invented certain new and useful Improvements in a Combined Guard and Cleaner for Lawn-Rakes; and I do hereby declare the following to be a full, clear, and exact description of the invention, such as will enable others skilled in the art to which it appertains to make and use the same.

This invention relates to rakes, and most particularly to a combined guard and cleaner to prevent trash and clods riding over the rake-head, and afford a ready means for clearing the rake-teeth of grass, weeds, and other accumulations.

The improvement consists of the novel features and the peculiar construction and combination of the parts, which will be hereinafter more fully described and claimed, and which are shown in the annexed drawings, in which—

Figure 1:
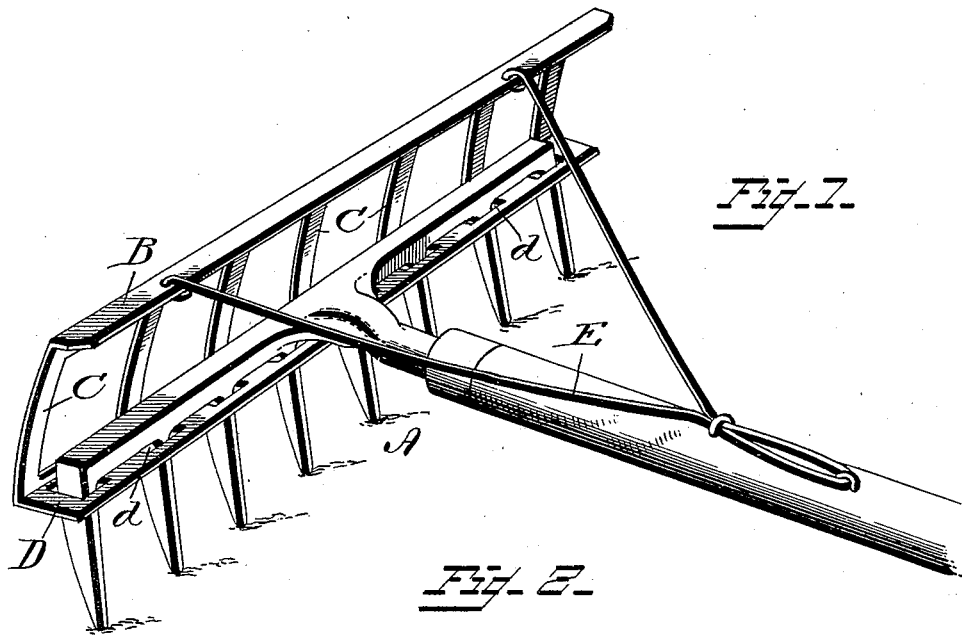
Figure 2:
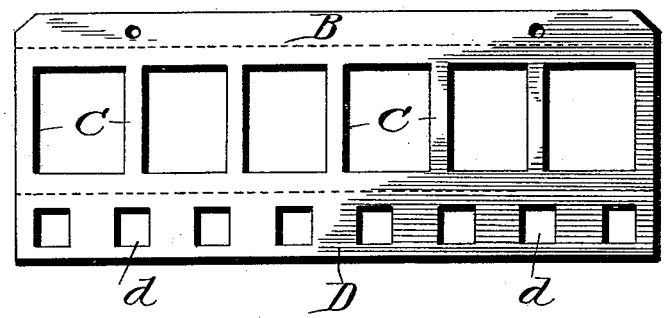
Figure 3:
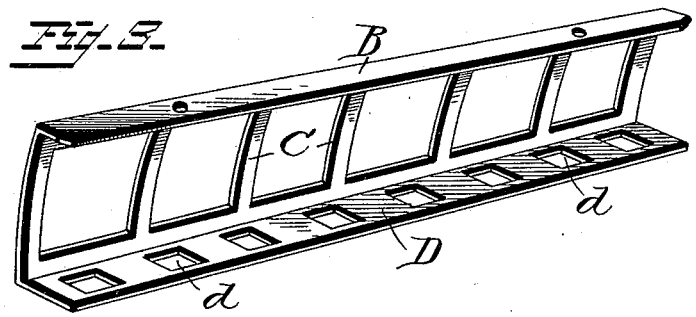

Figure 1 is a perspective view of a rake embodying my invention. Fig. 2 is a plan view of the blank from which the combined guard and cleaner is formed. Fig. 3 is a view of the combined guard and cleaner detached.

The rake A is of any ordinary construction, being shown to illustrate the application of the invention.

The combined guard and cleaner is composed of the parallel plates B and D and the connecting-strips C. The cleaner-plate D is provided with a series of openings $d$, which correspond in number and position with the rake-teeth, the latter passing through the said openings. The plate B forms a head-bar and strengthens the device, and serves to connect and brace the strips C at their upper ends.

The device normally occupies an elevated position with reference to the working position of the rake, being limited in its upward motion by the plate D engaging with the rake-head. The Y-spring E, secured at one end to the handle, is connected at the ends of its diverging members with the plate B, and serves to retain the device in its elevated position and return it to the said position after being operated to clean the rake. The strips C and the plate B, extending above the rake-head, prevent trash, clods, &c., riding over the said rake when in efficient service. The attachment is constructed from a piece of sheet metal or may be cast from pig-metal and annealed, which is perforated substantially in the manner shown in Fig. 2, a portion along each edge being bent at right angles to form the plates B and D.

In its normal position the device forms a guard, and to clean the rake the foot is placed on the plate B and sufficient pressure exerted to depress the device against the tension of the spring E. When the foot is removed, the spring returns the device to a normal position.

The rake may be cleaned by inverting it and striking the device upon the ground or lawn. When returned to its normal position, the spring retains the device.

Having thus described my invention, what I claim, and desire to secure by Letters Patent, is—

1. The combination, with a rake, of a combined guard and cleaner consisting of the plate D, perforated at intervals to correspond with and receive the rake-teeth, the plate B, parallel with and connected at intervals by means of the strips C with the said plate D, the said strips C forming the guard, substantially as and for the purpose described, and a spring for holding and returning the attachment to a normal position.

2. The combination, with a rake, of the hereinbefore shown and described combined guard and rake, consisting of a single piece of sheet metal having a portion along its top and bottom edges bent to form the plates B and D and having the intermediate portion perforated at intervals to form the strips C, the plate D being perforated at intervals to correspond with and receive the rake-teeth, and a spring E, substantially as and for the purpose specified.

In testimony whereof I affix my signature in presence of two witnesses.

JOHN H. HALDEMAN.

Witnesses:
MICHAEL STUMP,
ALBERT D. WIKE.